(12) United States Patent
Peuhkurinen (10) Patent No.: US 10,990,167 B1
(45) Date of Patent: Apr. 27, 2021

(54) DISPLAY APPARATUS AND METHOD USING PROJECTION MATRICES TO GENERATE IMAGE FRAMES

(71) Applicant: Varjo Technologies Oy, Helsinki (FI)

(72) Inventor: Ari Antti Peuhkurinen, Helsinki (FI)

(73) Assignee: Varjo Technologies Oy, Helsinki (FI)

(*) Notice: Subject to any disclaimer, the term of this patent is extended or adjusted under 35 U.S.C. 154(b) by 0 days.

(21) Appl. No.: 16/659,639

(22) Filed: Oct. 22, 2019

(51) Int. Cl.
| | |
|---|---|
| G03B 21/14 | (2006.01) |
| H04N 9/31 | (2006.01) |
| G06F 3/01 | (2006.01) |
| G09G 5/00 | (2006.01) |
| G02B 27/01 | (2006.01) |
| G06T 19/00 | (2011.01) |
| G06K 9/00 | (2006.01) |

(52) U.S. Cl.
CPC ........... G06F 3/012 (2013.01); G02B 27/017 (2013.01); G06F 3/013 (2013.01); G06F 3/014 (2013.01); G06K 9/00604 (2013.01); G06T 19/006 (2013.01); *G02B 2027/014* (2013.01)

(58) Field of Classification Search
CPC ........... G06F 3/012; G06F 3/013; G06F 3/014
See application file for complete search history.

(56) References Cited

U.S. PATENT DOCUMENTS

| | | | | |
|---|---|---|---|---|
| 9,588,408 B1* | 3/2017 | Linnell | ................. | H04N 9/3188 |
| 9,928,660 B1* | 3/2018 | Vembar | ...................... | G06F 3/14 |
| 2010/0097398 A1* | 4/2010 | Tsurumi | ............... | G11B 27/034 345/634 |
| 2017/0171538 A1* | 6/2017 | Bell | ....................... | G06T 19/006 |
| 2018/0075820 A1 | 3/2018 | Hicks et al. | | |
| 2019/0096023 A1 | 3/2019 | Diefenbaugh et al. | | |

FOREIGN PATENT DOCUMENTS

WO 2018100240 A1 6/2018

OTHER PUBLICATIONS

International Search Report and Written Opinion of the International Searching Authority, Application No. PCT/FI2020/050627, dated Dec. 16, 2020, 16 pages.
Van Wavern "The Asynchronous Time Warp for Virtual Reality on Consumer Hardware" Proceedings of the 22nd ACM Conference on Virtual Reality Software and Technology, VRST '16, ACM Press, New York, New York, USA, Nov. 3, 2016, DOI: 10.1145/2993369.2993375, ISBN: 978-1-4503-4491-3, 10 pages.

* cited by examiner

*Primary Examiner* — Md Saiful A Siddiqui (74) *Attorney, Agent, or Firm* — Ziegler IP Law Group, LLC (57) ABSTRACT

A display apparatus including display or projector, means for tracking position and orientation of user's head, and processor coupled to display or projector and said means. The processor or external processor communicably coupled to processor is configured to obtain head-tracking data indicative of position and orientation; process head-tracking data to determine current position and orientation of user's head and velocity and/or acceleration with which position and orientation is changing; predict first and second position and orientation of user's head at time t1 and t2, respectively; determine first and second projection matrices to be applied to three-dimensional image data of given frame, respectively; and apply first and second projection matrices to said image data to generate first image frame and second image frame, respectively. Processor is configured to render first and second image frame at time t1 and t2, respectively.

14 Claims, 6 Drawing Sheets

DISPLAY APPARATUS AND METHOD USING PROJECTION MATRICES TO GENERATE IMAGE FRAMES

TECHNICAL FIELD

The present disclosure relates generally to display apparatuses; and more specifically, to display apparatuses comprising displays or projectors, means for tracking position and orientation of user's head and processors coupled to the displays or projectors and said means. Moreover, the present disclosure also relates to methods.

BACKGROUND

Presently, several technologies (for example, such as virtual reality (VR), augmented reality (AR), mixed reality (MR) and the like) are being used to present interactive extended-reality environments to users. Typically, the users utilize specialized devices (for example, such as a virtual reality device, an augmented reality device, a mixed reality device, and the like) for experiencing and interacting with such extended-reality environments. In use, the user generally wears (namely, supports) the specialized device on his/her head. Moreover, the user moves his/her head to 'look around' within the extended-reality environment.

Such conventional specialized devices employ various equipment in order to generate and render images that constitute the extended-reality environment. However, existing specialized devices have certain limitations associated therewith. In particular, the user moves his/her head around while using the specialized devices, but the existing specialized devices are unable to cope with rendering requirements associated with such head movement. Notably, the existing specialized devices require a large amount of time to post-process images to adapt to the head movements of the user, thereby increasing perceived rendering latency of the specialized devices. As a result, the user's experience of immersiveness within the extended-reality environments is adversely affected. Some existing specialized devices render extra information in addition to a currently visible extended-reality view, in order to accommodate for head movements of the user. However, this extra information is often incorrectly perceived as a visual artifact by the user.

Therefore, in light of the foregoing discussion, there exists a need to overcome the aforementioned drawbacks associated with existing display apparatuses.

SUMMARY

The present disclosure seeks to provide a display apparatus. The present disclosure also seeks to provide a method. The present disclosure seeks to provide a solution to the existing problems associated with generating and rendering images according to movement of a user's head. An aim of the present disclosure is to provide a solution that overcomes at least partially the problems encountered in prior art, and provides an efficient and reliable display apparatus that generates and renders images that are optimized according to the movement of the user's head.

In one aspect, an embodiment of the present disclosure provides a display apparatus comprising:
at least one display or projector;
means for tracking a position and orientation of a user's head; and
a processor coupled to the at least one display or projector and said means, wherein the processor or at least one external processor communicably coupled to the processor is configured to:
  obtain, from said means, head-tracking data indicative of the position and orientation of the user's head;
  process the head-tracking data to determine a current position and orientation of the user's head and a velocity and/or acceleration with which the position and orientation of the user's head is changing;
  predict, based on the current position and orientation of the user's head and the determined velocity and/or acceleration, at least a first position and orientation and a second position and orientation of the user's head at time t1 and t2, respectively, during a lifetime of a given frame being rendered;
  determine, based on the predicted first position and orientation and the predicted second position and orientation of the user's head, at least one first projection matrix and at least one second projection matrix to be applied to three-dimensional image data pertaining to the given frame, respectively; and
  apply the at least one first projection matrix and the at least one second projection matrix to said three-dimensional image data to generate at least one first image frame and at least one second image frame, respectively,
wherein the processor is configured to render, via the at least one display or projector, the at least one first image frame and the at least one second image frame at the time t1 and t2, respectively, during the lifetime of the given frame.

In another aspect, an embodiment of the present disclosure provides a method comprising:
  obtaining head-tracking data indicative of a position and orientation of a user's head;
  processing the head-tracking data to determine a current position and orientation of the user's head and a velocity and/or acceleration with which the position and orientation of the user's head is changing;
  predicting, based on the current position and orientation of the user's head and the determined velocity and/or acceleration, at least a first position and orientation and a second position and orientation of the user's head at time t1 and t2, respectively, during a lifetime of a given frame being rendered;
  determining, based on the predicted first position and orientation and the predicted second position and orientation of the user's head, at least one first projection matrix and at least one second projection matrix to be applied to three-dimensional image data pertaining to the given frame, respectively;
  applying the at least one first projection matrix and the at least one second projection matrix to said three-dimensional image data to generate at least one first image frame and at least one second image frame, respectively; and
  rendering, via at least one display or projector, the at least one first image frame and the at least one second image frame at the time t1 and t2, respectively, during the lifetime of the given frame.

Embodiments of the present disclosure substantially eliminate or at least partially address the aforementioned problems in the prior art, and enable generation of images to be rendered at a display apparatus according to head pose of the user using the display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 6A illustrates how an exemplary view of a visual scene is occluded in prior art, whereas

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
at least one display or projector;
means for tracking a position and orientation of a user's head; and
a processor coupled to the at least one display or projector and said means, wherein the processor or at least one external processor communicably coupled to the processor is configured to:

obtain, from said means, head-tracking data indicative of the position and orientation of the user's head;

process the head-tracking data to determine a current position and orientation of the user's head and a velocity and/or acceleration with which the position and orientation of the user's head is changing;

predict, based on the current position and orientation of the user's head and the determined velocity and/or acceleration, at least a first position and orientation and a second position and orientation of the user's head at time t1 and t2, respectively, during a lifetime of a given frame being rendered;

determine, based on the predicted first position and orientation and the predicted second position and orientation of the user's head, at least one first projection matrix and at least one second projection matrix to be applied to three-dimensional image data pertaining to the given frame, respectively; and apply the at least one first projection matrix and the at least one second projection matrix to said three-dimensional image data to generate at least one first image frame and at least one second image frame, respectively, wherein the processor is configured to render, via the at least one display or projector, the at least one first image frame and the at least one second image frame at the time t1 and t2, respectively, during the lifetime of the given frame.

In another aspect, an embodiment of the present disclosure provides a method comprising:

obtaining head-tracking data indicative of a position and orientation of a user's head;

processing the head-tracking data to determine a current position and orientation of the user's head and a velocity and/or acceleration with which the position and orientation of the user's head is changing;

predicting, based on the current position and orientation of the user's head and the determined velocity and/or acceleration, at least a first position and orientation and a second position and orientation of the user's head at time t1 and t2, respectively, during a lifetime of a given frame being rendered;

determining, based on the predicted first position and orientation and the predicted second position and orientation of the user's head, at least one first projection matrix and at least one second projection matrix to be applied to three-dimensional image data pertaining to the given frame, respectively;

applying the at least one first projection matrix and the at least one second projection matrix to said three-dimensional image data to generate at least one first image frame and at least one second image frame, respectively; and rendering, via at least one display or projector, the at least one first image frame and the at least one second image frame at the time t1 and t2, respectively, during the lifetime of the given frame.

The present disclosure provides the aforementioned display apparatus and the aforementioned method. The at least one display or projector renders the at least one first image frame and the at least one second image frame dynamically based on the user's head current and predicted head pose. This allows for providing a truly immersive and realistic extended-reality experience to the user. Furthermore, the external processor may be beneficially used to reduce processing burden on the processor of the display apparatus. As a result, the display apparatus provides better device performance as compared to existing imaging systems. Moreover, the display apparatus easily adapts to varying framerate and dynamically generates image frames based on changing position and orientation of the user's head with minimal latency. Furthermore, the method described herein is computationally efficient and simple.

Throughout the present disclosure, the term "display apparatus" refers to specialized equipment that is configured to present an extended-reality environment to the user when the display apparatus in operation is worn by the user on his/her head. In such an instance, the display apparatus acts as a device (for example, such as a virtual reality headset, a pair of virtual reality glasses, an augmented reality headset, a pair of augmented reality glasses, a mixed reality headset, a pair of mixed reality glasses, and so forth) that is operable to present a visual scene of the extended-reality environment to the user. The display apparatus may also commonly be referred to as "head-mounted display apparatus".

It will be appreciated that the term "extended-reality" encompasses virtual reality, augmented reality, mixed reality, and the like.

Throughout the present disclosure, the term "display" refers to equipment that, in operation, displays images that are to be shown to the user of the display apparatus, whereas the term "projector" refers to equipment that, in operation, projects images that are to be shown to the user of the display apparatus. Optionally, when the display apparatus comprises at least one projector, the images are projected by the at least one projector onto a projection screen. It will be appreciated that the term "at least one display or projector" refers to "one display or projector" in some implementations, and "a plurality of displays or projectors" in other implementations.

Optionally, the at least one display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, the at least one projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Throughout the present disclosure, the term "means for tracking the position and orientation of the user's head" refers to specialized equipment for detecting and/or following the position and orientation of the user's head within a real-world environment, when the display apparatus is worn by the user on his/her head. In particular, the means for tracking the position and orientation of the user's head actually tracks a position and orientation of the display apparatus, which corresponds to the position and orientation of the user's head. The means for tracking the position and orientation of the user's head tracks a pose of the user's head, wherein the term "pose" encompasses both position and orientation.

The means for tracking the position and orientation of the user's head is a true six Degrees of Freedom (6DoF) tracking system. Notably, said means tracks both the position and the orientation of the user's head in three dimensions. In particular, said means is configured to track translational movements (namely, surge, heave and sway movements) and rotational movements (namely, roll, pitch and yaw movements) of the user's head within a three-dimensional space of the real-world environment. It will be appreciated that use of said means in the display apparatus allows for providing a truly immersive extended-reality experience to the user by enabling adjustment of the visual scene (by the processor or the at least one external processor) according to a current pose of the user's head. This provides a realistic perception of the extended-reality environment to the user.

Optionally, the means for tracking the position and orientation of the user's head is implemented as at least one of: an Inertial Measurement Unit (IMU), a timing and inertial measurement unit, at least one detector that detects at least one detectable object. Additionally or alternatively, optionally, the means for tracking the position and orientation of the user's head is implemented as at least one detector for detecting at least one detectable object. When the at least one detectable object is arranged in the real-world environment, the at least one detector is arranged on the display apparatus, and vice versa. Optionally, in this regard, the at least one detectable object is implemented as at least one marker (for example, a Quick Response (QR) code, an ArUco marker, an Radio Frequency Identification (RFID) marker, and the like), and the at least one detector is implemented as at least one of: an active infrared (IR) light-emitting diode, an IR camera, an IR transceiver, a visible light-emitting diode, a visible light camera, a laser illuminator, a RFID Reader.

Optionally, the means for tracking the position and orientation of the user's head is arranged in the display apparatus. Alternatively, optionally, the means for tracking the position and orientation of the user's head is partially arranged in the real-world environment and partially arranged in the display apparatus.

Throughout the present disclosure, the term "processor" refers to hardware, software, firmware or a combination of these, suitable for controlling the operation of the display apparatus. The processor is controls operation of the at least one display or projector and obtains input from the means for tracking the position and orientation of the user's head.

Throughout the present disclosure, the term "external processor" refers to a processor that is implemented as a processor of an external computing device that is communicably coupled to the processor of the display apparatus. The external processor is communicably coupled to the processor wirelessly and/or in a wired manner. It will be appreciated that computational tasks associated with three-dimensional warping of image frames are typically computationally expensive. Therefore, performing said computational tasks at the external processor may be beneficial, as it would considerably reduce processing burden on the processor of the display apparatus. It will be appreciated that the term "at least one external processor" refers to "one external processor" in some implementations, and "a plurality of external processors" in other implementations.

The processor or the at least one external processor is communicably coupled to the means for tracking the position and orientation of the user's head, to obtain the head-tracking data indicative of the position and orientation of the user's head. It will be appreciated that the head tracking data is obtained repeatedly for a given display apparatus as the user's head pose keeps changing whilst he/she uses the display apparatus. An up-to-date information indicative of the user's head pose allows for producing an up-to-date extended-reality environment for the display apparatus.

The head-tracking data is processed to determine the current position and orientation of the user's head and the velocity and/or acceleration with which the position and orientation of the user's head is changing. When the user uses the display apparatus, the position and/or the orientation of his/her head may change. Notably, head-tracking data of a current time instant is indicative of the current position and orientation of the user's head, whereas head-tracking data of the current time instant as well as at least one previous time instant is indicative of the velocity and/or acceleration with which the position and orientation of the user's head is changing.

The processor or the at least one external processor utilizes the current position and orientation of the user's head and the determined velocity and/or acceleration, to predict at least the first position and orientation and the second position and orientation of the user's head at the time t1 and t2, respectively, during the lifetime of the given frame being rendered. When the position and/or the orientation of the user's head is/are changing, a rate of said change is indicated by the determined velocity and/or acceleration. Given the current position and orientation of the user's head and the determined velocity and/or acceleration, the processor or the external processor calculates and predicts positions and orientations of the user's head at future time instants (namely, time instants later than the current time instant). It will be appreciated that the given frame (of an image) is rendered for a specific time period. Within said time period, the position and orientation of the user's head may or may not change. In order to provide an immersive viewing experience that predictively optimizes the visual scene according to the user's head pose, at least the first position and orientation of the user's head at time t1 and the second position and orientation of the user's head at time t2 are predicted. These predicted first and second positions and orientations are utilized for providing a perspective-correct visual scene to the user at the time t1 and t2.

Throughout the present disclosure, the phrase "lifetime of the given frame" refers to a duration (namely, a time period) for which the given frame is to be rendered via the at least one display or projector. Optionally, within the lifetime of the given frame, the time t1 occurs prior to the time t2. As an example, the lifetime of the given frame rendered at time instant T may be 10 milliseconds. In such an example, the time t1 may be T+3 milliseconds and the time t2 may be T+6 milliseconds.

In an example implementation, when a frequency at which full images are to be rendered is 100 Hertz and a given image is composed of 10 frames, a frequency at which the frames are to be rendered would be 1 kilohertz. This means that full images are rendered at a 100 Hertz rate to a rendering buffer associated with the at least one display or projector, and a single full image is used 10 times over a 10 millisecond time period to create a new frame to be rendered. In such a case, the lifetime of the given frame would be 1 millisecond. In such a case, the head-tracking data can be obtained at frequency of 1 kilohertz in order to efficiently utilize latest head pose information to process the frames in an optimal, realistic manner.

It will be appreciated that the user may move his/her head while using the display apparatus for various reasons such as his/her comfort, a motion of a moving object in the visual scene, a sound made by a given object in the visual scene, and the like. When the velocity and/or acceleration of the user's head is known, the processor predicts a next change in the position and orientation of the user's head to be along a direction of the velocity and/or acceleration. As an example, when the visual scene depicts a moving object (for example, such as a rocket) that moves upwards, the processor may predict at least the first position and orientation and the second position and orientation of the user's head at the time t1 and t2, respectively, to be along the upward direction. In such a case, the second position and orientation of the user's head at the time t2 would be such that the user views a point in the visual scene that lies above (namely, higher than) another point in the visual scene that the user views with the first position and orientation of the user's head at the time t1.

It will be appreciated that in some implementations, a third position and orientation of the user's head at time t3, a fourth position and orientation of the user's head at time t4, and so on during the lifetime of the given frame being rendered, may be predicted. Optionally, the time t3 slightly overshoots the time t2 at which the at least one second image frame is to be rendered. This would ensure that a perspective-correct visual scene is provided to the user at the time t2. This is especially useful in cases where the time t2 lies towards an end of the lifetime of the given frame since further changes in the user's head pose are predictively accounted for whilst rendering the second image frame at the time t2.

Throughout the present disclosure, the term "projection matrix" refers to a projection matrix that is indicative of a geometrical relationship between three-dimensional points of an extended-reality visual scene and two-dimensional pixels of the at least one display or projector. Moreover, optionally, a given projection matrix is determined based on near and far clipping planes as well as a field-of-view defined for the at least one display or projector. Optionally, a transformation function is used to build the given projection matrix. Herein, the terms "first projection matrix" and "second projection matrix" refer to different projection matrices that correspond to the predicted first position and orientation and the predicted second position and orientation of the user's head, respectively.

It will be appreciated that a given projection matrix is applied to a three-dimensional camera coordinate system. Therefore, the given projection matrix can be understood to be applied to the three-dimensional image data pertaining to the given frame. Herein, the term "three-dimensional image data" refers to three-dimensional data pertaining to a given image. In such a case, said three-dimensional data may, for example, include triangles, points, voxels, and the like to which a given projection matrix is applied. Moreover, the three-dimensional image data may, for example, include an image frame as well as its Z-buffer. In such a case, image processing can use additional Z-buffer for better understanding of the red-green-blue (RGB) image buffer depth information.

The at least one first projection matrix and the at least one second projection matrix are applied to said three-dimensional image data to generate the at least one first image frame and the at least one second image frame, respectively. The at least one first projection matrix and the at least one second projection matrix transform the three-dimensional image data of the given frame into corresponding points of the at least one first image frame and the at least one second image frame. As a result, the generated at least one first image frame and at least one second image frame are optimally representative of how the given frame would appear to the user at the time t1 and t2, given that the user's head pose changes as predicted.

The processor is configured to render, via the at least one display or projector, the at least one first image frame and the at least one second image frame at the time t1 and t2, respectively, during the lifetime of the given frame. It will be appreciated that a given image frame is rendered for a specific time duration only, said time duration being calculated based upon the frequency at which full images are to be rendered and a number of image frames per full image. Moreover, the given frame is rendered using at least one rendering method. As an example, the given frame may be rendered as a mesh, a texture or a combination thereof. Such rendering methods are well-known in the art.

Optionally, a size of the at least one first image frame and the at least one second image frame of the given frame is determined based on a position the user's head within the real-world environment. In this regard, if the user moves forward or backward from a current position, sizes of the at least one first image frame and the at least one second image frame of the given frame are increased or decreased, respectively.

Optionally, the at least first image frame and the at least second image frame of the given frame are rendered in a manner that the given frame has render buffer, thereby making visual content of the given frame available for some extra time beyond the lifetime of the given frame. Alternatively, optionally, the at least one first image frame and the at least one second image frame of the given frame are rendered in a manner that edges of the given frame are well fitted to a render area of the display apparatus. In such a case, the processor is configured to precisely generate the at least one first image frame and the least one second image frame in order to optimally and fully fill render area.

Optionally, the processor or the at least one external processor is configured to determine, based on the predicted first position and orientation and the predicted second position and orientation of the user's head, a first occluded area of the at least one first image frame and a second occluded area of the at least one second image frame, respectively, wherein the processor is configured to control the at least one display or projector to render only an area of the at least one first image frame other than the first occluded area at the time t1 and to render only an area of the at least one second image frame other than the second occluded area at the time t2.

Throughout the present disclosure, the term "occluded area" refers to an area of a given image frame that cannot be seen by the user. Typically, the occluded area of the given image frame lies along a periphery of the given image frame, and is not rendered as it cannot be seen by the user.

Herein, the terms "first occluded area" and "second occluded area" refer to occluded areas of the at least one first image frame and the at least one second image frame, respectively. In particular, the first and second occluded areas are defined by the at least one first projection matrix and the at least one second projection matrix. Notably, since the at least one first projection matrix and the at least one second projection matrix are determined based on the predicted first position and orientation and the predicted second position and orientation of the user's head, it will be appreciated that the first and second occluded areas are estimated based on the current position and orientation of the user's head and the determined velocity and/or acceleration.

Optionally, sizes of the first occluded area and the second occluded area are determined using at least one mathematical formula. Optionally, when the at least one first image frame and the at least one second image frame are rectangular in shape, sizes of the first occluded area and the second occluded area are calculated using the following mathematical formula:

Occluded area of a given image frame=Area covered by side portions of the given image frame–area covered by corners of the given image frame.

As an example, a square image having 2000 pixels lengthwise and 2000 pixels widthwise may have 100 pixels wide side portions allocated for occlusion. In such an example, Area of the square image=2000 pixels×2000 pixels=4 Megapixels;

Area covered by side portions of the square image=4*2000*100 pixels=800000 pixels;

Area covered by corners of the square image=4100*100 pixels=40000 pixels;

Therefore, occluded area of the square image=Area covered by the side portions–Area covered by the corners=800000–40000=760000 pixels.

It will be appreciated that the predicted first and second positions and orientations of the user's head are used to adjust the shape and size of the first and second occluded areas. In particular, the first and second occluded areas are stretched or shrunk and reshaped according to the predicted first and second positions and orientations of the user's head, respectively. The first and second occluded areas thus determined are optimally shaped and sized, thereby subsequently optionally allowing for optimizing resource usage of the render buffer. As an example, when the predicted first and second positions and orientations of the user's head lie towards a top-right region of the visual scene, the first and second occluded areas are stretched and reshaped towards a top-right direction of the visual scene.

It will also be appreciated that as the first and second occluded areas are not to be rendered, better rendering performance is achieved while rendering only selective areas of the at least one first image frame and the at least one second image frame.

Optionally, when controlling the at least one display or projector to render selective areas of the at least one first image frame and the at least one second image frame, the processor is configured to fill a render buffer of the at least one display or projector with only the area of the at least one first image frame other than the first occluded area at the time t1 and to fill a render buffer of the at least one display or projector with only the area of the at least one second image frame other than the second occluded area at the time t2. Notably, the processor determines an optimal size of the render buffer, based on the determined sizes of the first occluded area and the second occluded area. This reduces unwanted processing burden on the render buffer.

Optionally, the processor or the at least one external processor is configured to generate the at least one first image frame and the at least one second image frame as individual parts of at least one combined output frame. In such a case, the at least one combined output frame is rendered in parts, said parts being rendered at different times. Herein, the term "combined output frame" refers to an output frame that includes at least the first image frame and the second image frame. Moreover, in this case, the render buffer is re-sized to a larger size as compared to a case of multiple viewports (namely, separate viewports provided by the at least one first image frame and the at least one second image frame individually).

Optionally, the processor or the at least one external processor is configured to determine a combined occluded area that is occluded in both the at least one first image frame and the at least one second image frame, wherein the processor is configured to control the at least one display or projector to render only an area of the at least one combined output frame other than the combined occluded area. Herein, the "combined occluded area" refers to a common portion of the first occluded area and the second occluded area. In this regard, the processor is configured to fill the render buffer of the at least one display or projector with only the area of the at least one combined output frame other than the combined occluded area. The combined occluded area acts as an optimized occlusion mask, which allows for only needed image frame content to be produced to optimize resource usage.

Optionally, the display apparatus further comprises means for tracking gaze directions of the user's eyes, wherein the processor or the at least one external processor is configured to:
- obtain, from said means, eye-tracking data indicative of the gaze directions of the user's eyes;
- process the eye-tracking data to determine current gaze directions of the user's eyes and velocities and/or accelerations with which the gaze directions of the user's eyes are changing;
- predict, based on the current gaze directions of the user's eyes and the determined velocities and/or accelerations, first gaze directions and second gaze directions of the user's eyes at the time t1 and t2, respectively, during the lifetime of the given frame being rendered; and
- determine, based on the predicted first gaze directions and the predicted second gaze directions of the user's eyes, the at least one first projection matrix and the at least one second projection matrix to be applied to the three-dimensional image data pertaining to the given frame, respectively.

Throughout the present disclosure, the term "means for tracking the gaze directions" refers to specialized equipment for detecting and/or following gaze directions of the user's eyes. Notably, the means for tracking gaze directions generates the eye-tracking data indicative of the gaze directions of the user's eyes. It will be appreciated that a gaze direction of a left eye of the user is different from a gaze direction of a right eye of the user. As an example, when the user is looking at a nearby object in the visual scene, the user's eyes converge. Notably, in such a case, the left eye of the user gazes rightwards, whereas the right eye of the user gazes leftwards.

Optionally, the means for tracking the gaze directions is implemented by way of contact lenses with sensors, cameras monitoring the position of the pupil of the user's eye, and the like. Such means for tracking the gaze directions are well-known in the art. It is to be understood that the means for tracking the gaze direction may also be referred to as an "eye-tracker system", a "gaze-tracking system" or a "means for detecting the gaze direction".

It will be appreciated that the eye-tracking data is obtained repeatedly for a given display apparatus as the gaze directions of the user's eyes keeps changing whilst he/she uses the display apparatus. An up-to-date information indicative of the gaze directions of the user's eyes allows for producing an up-to-date foveated extended-reality environment for the display apparatus.

Optionally, the eye-tracking data is processed to determine the current gaze directions of the user's eyes and the velocities and/or accelerations with which the gaze directions of the user's eyes are changing. When the user uses the display apparatus, the gaze directions of the user's eyes may change. Notably, eye-tracking data of a current time instant is indicative of the current gaze directions of the user's eyes, whereas eye-tracking data of the current time instant as well as at least one previous time instant is indicative of the velocities and/or accelerations with which the gaze directions of the user's eyes are changing.

Optionally, the processor or the external processor predicts a change in the gaze directions of the user's eyes based on the determined velocities and/or accelerations with which the gaze directions of the user's eyes are changing. Subsequently, the processor or the external processor predicts the first gaze directions and second gaze directions of the user's eyes at the time t1 and t2, respectively, based upon the predicted change in the gaze directions of the user's eyes.

Additionally, optionally, the at least one processor is configured to predict the first gaze directions and the second gaze directions, based also upon scene information pertaining to the given frame. Optionally, in this regard, the scene information comprises information indicative of a location of an object present in the visual scene that has at least one of: an audio feature of interest, a visual feature of interest, a physical interaction with another object present in the visual scene. Notably, there exists a high likelihood that the user's gaze would be directed towards such an object, as such distinctive characteristics of the object generally attract the user's attention.

Optionally, when the at least one first projection matrix and the at least one second projection matrix are determined according to the predicted first gaze directions and the predicted second gaze directions, the display apparatus becomes capable of implementing active foveation whilst presenting the visual scene to the user.

Optionally, the at least one display or projector comprises at least one context display or projector and at least one focus display or projector, wherein the at least one first image frame comprises a first context image frame and a first focus image frame to be rendered at the at least one context display or projector and the at least one focus display or projector, respectively, at the time t1, and the at least one second image frame comprises a second context image frame and a second focus image frame to be rendered at the at least one context display or projector and the at least one focus display or projector, respectively, at the time t2.

Optionally, in this regard, the at least one display or projector is implemented as a Fovea Contingent Display (FCD) or a Fovea Contingent Projector (FCP) that, in operation, renders a foveated visual scene of the extended-reality environment. Optionally, the at least one context display or projector has a first display resolution and the at least one focus display or projector has a second display resolution, the first display resolution being lower than the second display resolution. It will be appreciated that the FCD or the FCP is designed to imitate a physiology of human vision. The FCD or the FCP allows for increasing immersion and realism within the extended-reality environment.

Notably, the term "focus image frame" refers to an image frame that is to be used to generate focus images, said focus images corresponding to a region of interest of the visual scene or a part of the region of interest. Moreover, the term "context image frame" refers to an image frame that is to be used to generate context images, said context images corresponding to at least a remaining region of the visual scene that is different from the region of interest. Herein, the term "region of interest" refers to a region of the visual scene towards which the gaze directions of the user's eyes is directed (namely, focused).

In an embodiment, a given context image frame represents only that remaining region of the visual scene which is different from the region of interest. In another embodiment, a given context image frame represents an entirety of the visual scene.

Throughout the present disclosure, the term "context display or projector" refers to equipment that, in operation, renders context image frames. Similarly, the term "focus display or projector" refers to equipment that, in operation, renders focus image frames.

It will be appreciated that when the first context image frame and the first focus image frame are rendered at the time t1, they collectively constitute a foveated view of the visual scene at the time t1. Likewise, when the second context image frame and the second focus image frame are rendered at the time t2, they collectively constitute another foveated view of the visual scene at the time t2.

Optionally, an angular resolution of the first context image frame is lower than an angular resolution of the first focus image frame, and an angular resolution of the second context image frame is lower than an angular resolution of the second focus image frame, wherein the processor or the at least one external processor is configured to:
   determine, based on the predicted first gaze directions of the user's eyes, an opacity value of at least a portion of the first focus image frame and an opacity value of at least a portion of the first context image frame, wherein a projection of said portion of the first focus image frame is to be optically combined with a projection of said portion of the first context image frame; and
   determine, based on the predicted second gaze directions of the user's eyes, an opacity value of at least a portion of the second focus image frame and an opacity value of at least a portion of the second context image frame, wherein a projection of said portion of the second focus image frame is to be optically combined with a projection of said portion of the second context image frame.

Throughout the present disclosure, the term "angular resolution" of a given image frame refers to a number of pixels per degree (namely, points per degree (PPD)) of an angular width of a given portion of the given image frame, wherein the angular width is measured from the perspective of the user's eyes. Optionally, pixels per degree of the first context image frame and the second context image frame is lower than pixels per degree of the first focus image frame and the second focus image frame, respectively. It will be appreciated that the angular resolution of the first and second focus image frames is higher than the angular resolution of the first and second context image frames since the rendered first and second focus image frames are typically projected by the display apparatus on and around the foveas of the user's eyes, whereas the rendered first and second context image frames are projected by the display apparatus upon the retinas of the user's eyes. Such angular resolutions of the first and second focus and context image frames allows for emulating visual characteristics of the human visual system when the visual scene is viewed by the user of the display apparatus.

It will be appreciated that optionally determining the opacity value of at least the portion of the given focus image frame and the opacity value of at least the portion of the given context image frame whose projection is to be optically combined with the projection of said portion of the given focus image frame allows for proper additive blending of said portions upon optical combination. Optionally, said portions represent a same region of the visual scene in both the given focus image frame and the given context image frame, at different angular resolutions. In such a case, multiple display systems (namely, the at least one context display or projector and the at least one focus display or projector) provide foveated rendering within the display apparatus, and can optionally use lower-resolution portions of the given context image frame to back up pose overshoot in corresponding higher-resolution portions of the given focus image frame.

Optionally, when a given context image frame represents an entirety of the visual scene at a given time, upon rendering the given context image frame along with its corresponding focus image frame at the given time, the region of interest in the visual scene is additively rendered as said focus image frame optically combines with a portion of the given context image frame that corresponds to the region of interest. In such a case, determining the opacity values of said focus image frame and the portion of the of the given context image frame that corresponds to the region of interest allows for optimal blending and rendering of the region of interest.

It will be appreciated that the context image frame and the focus image frame are rendered substantially simultaneously in order to avoid time lag during combination of projections thereof.

The present disclosure also relates to the method as described above. Various embodiments and variants disclosed above, with respect to the aforementioned first aspect, apply mutatis mutandis to the method.

Optionally, the method further comprises:
   determining, based on the predicted first position and orientation and the predicted second position and orientation of the user's head, a first occluded area of the at least one first image frame and a second occluded area of the at least one second image frame, respectively; and
   controlling the at least one display or projector to render only an area of the at least one first image frame other than the first occluded area at the time t1 and to render only an area of the at least one second image frame other than the second occluded area at the time t2.

Optionally, the method further comprises generating the at least one first image frame and the at least one second image frame as individual parts of at least one combined output frame.

Optionally, the method further comprises:
   determining a combined occluded area that is occluded in both the at least one first image frame and the at least one second image frame; and
   controlling the at least one display or projector to render only an area of the at least one combined output frame other than the combined occluded area.

Optionally, the method further comprises:
   obtaining eye-tracking data indicative of gaze directions of the user's eyes;
   processing the eye-tracking data to determine current gaze directions of the user's eyes and velocities and/or accelerations with which the gaze directions of the user's eyes are changing;
   predicting, based on the current gaze directions of the user's eyes and the determined velocities and/or accelerations, first gaze directions and second gaze directions of the user's eyes at the time t1 and t2, respectively, during the lifetime of the given frame being rendered; and
   determining, based on the predicted first gaze directions and the predicted second gaze directions of the user's eyes, the at least one first projection matrix and the at least one second projection matrix to be applied to the three-dimensional image data pertaining to the given frame, respectively.

Optionally, in the method, the at least one display or projector comprises at least one context display or projector and at least one focus display or projector, wherein the at least one first image frame comprises a first context image frame and a first focus image frame for rendering at the at least one context display or projector and the at least one focus display or projector, respectively, at the time t1, and the at least one second image frame comprises a second context image frame and a second focus image frame for rendering at the at least one context display or projector and the at least one focus display or projector, respectively, at the time t2.

Optionally, in the method, an angular resolution of the first context image frame is lower than an angular resolution of the first focus image frame, and an angular resolution of the second context image frame is lower than an angular resolution of the second focus image frame, wherein the method further comprises:

determining, based on the predicted first gaze directions of the user's eyes, an opacity value of at least a portion of the first focus image frame and an opacity value of at least a portion of the first context image frame, wherein a projection of said portion of the first focus image frame is optically combined with a projection of said portion of the first context image frame; and     determining, based on the predicted second gaze directions of the user's eyes, an opacity value of at least a portion of the second focus image frame and an opacity value of at least a portion of the second context image frame, wherein a projection of said portion of the second focus image frame is optically combined with a projection of said portion of the second context image frame.

DETAILED DESCRIPTION OF THE DRAWINGS

Figure 1:
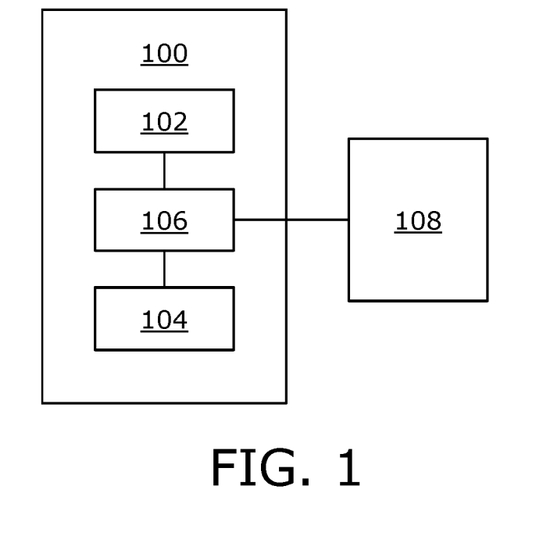
FIGS. 1 and 2 illustrate block diagrams of architectures of a display apparatus, in accordance with different embodiments of the present disclosure.

Referring to FIG. 1, illustrated is a block diagram of architecture of a display apparatus 100, in accordance with an embodiment of the present disclosure. The display apparatus 100 comprises at least one display or projector (depicted as a display or projector 102), means 104 for tracking a position and orientation of a user's head, and a processor 106 coupled to the display or projector 102 and said means 104. The processor 106 or at least one external processor (depicted as an external processor 108) communicably coupled to the processor 106 is configured to:

obtain, from said means 104, head-tracking data indicative of the position and orientation of the user's head;

process the head-tracking data to determine a current position and orientation of the user's head and a velocity and/or acceleration with which the position and orientation of the user's head is changing;

predict, based on the current position and orientation of the user's head and the determined velocity and/or acceleration, at least a first position and orientation and a second position and orientation of the user's head at time t1 and t2, respectively, during a lifetime of a given frame being rendered;

determine, based on the predicted first position and orientation and the predicted second position and orientation of the user's head, at least one first projection matrix and at least one second projection matrix to be applied to three-dimensional image data pertaining to the given frame, respectively; and     apply the at least one first projection matrix and the at least one second projection matrix to said three-dimensional image data to generate at least one first image frame and at least one second image frame, respectively, wherein the processor 106 is configured to render, via the display or projector 102, the at least one first image frame and the at least one second image frame at the time t1 and t2, respectively, during the lifetime of the given frame.

Figure 2:
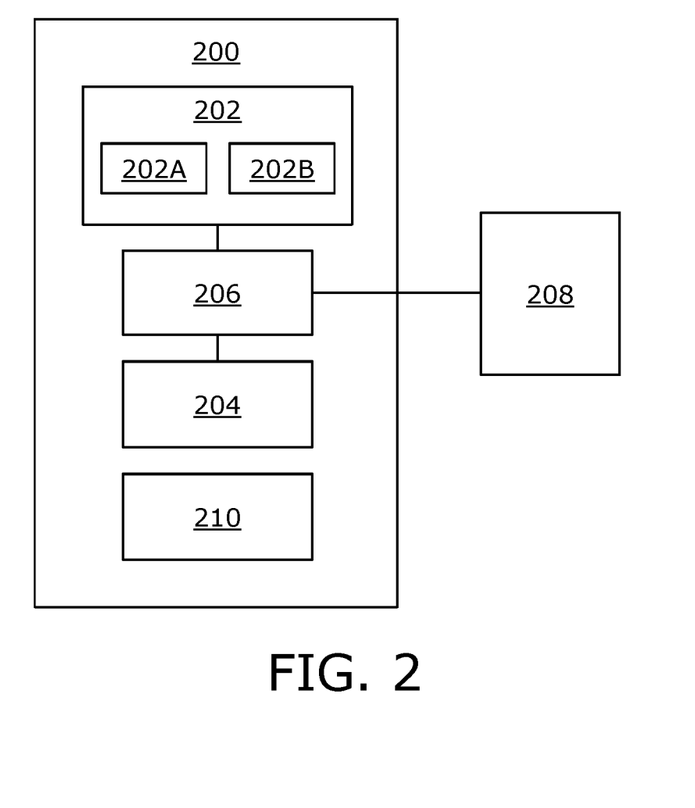

Referring to FIG. 2, illustrated is a block diagram of architecture of a display apparatus 200, in accordance with an embodiment of the present disclosure. The display apparatus 200 comprises at least one display or projector (depicted as a display or projector 202), means 204 for tracking a position and orientation of a user's head, and a processor 206 coupled to the display or projector 202 and said means 204. At least one external processor (depicted as an external processor 208) is communicably coupled to the processor 206. The display apparatus 200 further comprises means 210 for tracking gaze directions of the user's eyes. The display or projector 202 further comprises at least one context display or projector (depicted as a context display or projector 202A) and at least one focus display or projector (depicted as a focus display or projector 202B).

It may be understood by a person skilled in the art that FIG. 1 and FIG. 2 include simplified architectures of the display apparatus 100 and 200, respectively, for sake of clarity, which should not unduly limit the scope of the claims herein. The person skilled in the art will recognize many variations, alternatives, and modifications of embodiments of the present disclosure.

Figure 3:
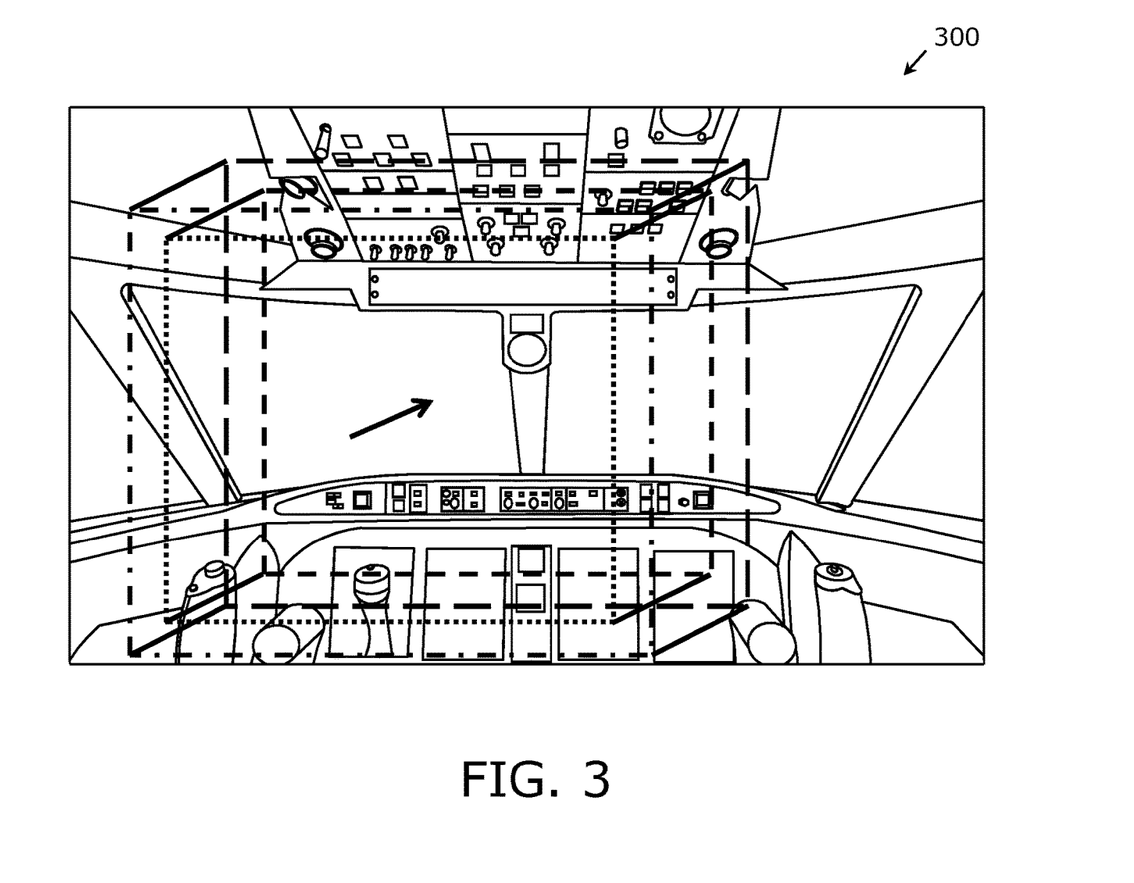
FIG. 3 illustrates an exemplary view of a visual scene, in accordance with an embodiment of the present disclosure.

Referring to FIG. 3, illustrated is an exemplary view of a visual scene 300, in accordance with an embodiment of the present disclosure. The visual scene 300 depicts an airplane cockpit. As shown, a first image frame (depicted as a dot-dashed rectangle) is rendered via at least one display or projector of a display apparatus. The first image frame is generated based on at least a first position and orientation of a user's head at time t1 when the display apparatus is worn by the user. Notably, only a portion (depicted as a dotted rectangle) of the first image frame is actually visible to a user of the display apparatus. An arrow depicts a direction indicative of change in view based on head-tracking data indicative of a current position and orientation of the user's head. Upon change the position and orientation of the user's head, a second image frame (depicted as a long-dashed rectangle) is rendered via the at least one display or projector. The second image frame is generated based on at least a second position and orientation of the user's head at time t2 when the display apparatus is worn by the user. Notably, only a portion (depicted as a small-dashed rectangle) of the second image frame is actually visible to the user of the display apparatus.

Figure 4:
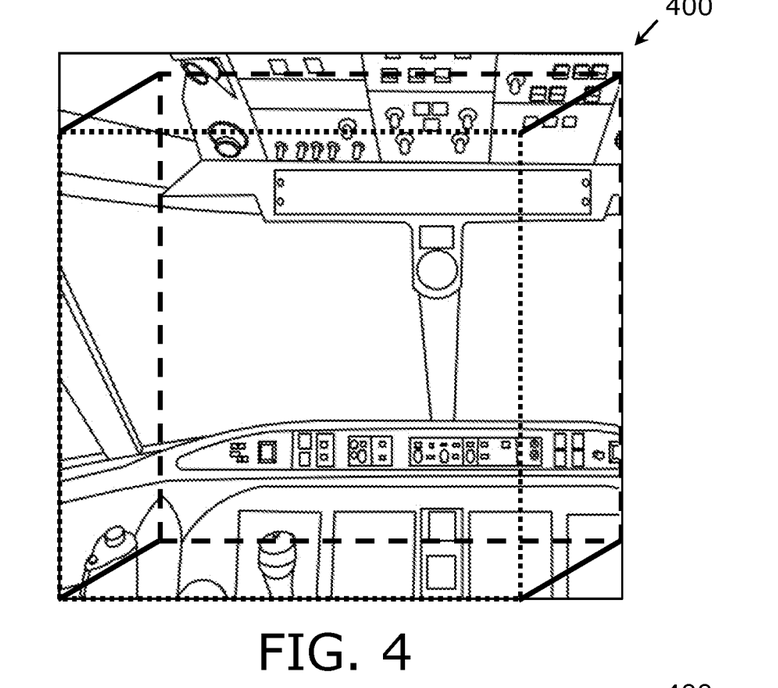
FIGS. 4 and 5 illustrate exemplary views of a visual scene to be displayed at a display apparatus, in accordance with different embodiments of the present disclosure.
Figure 5:
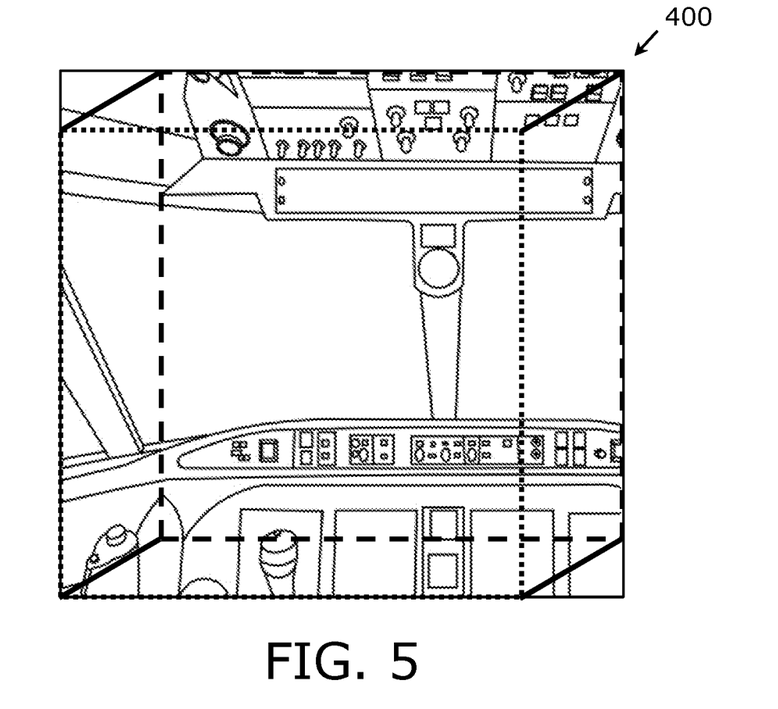

Referring to FIGS. 4 and 5, illustrated is exemplary view of a visual scene 400 to be displayed at a display apparatus, in accordance with different embodiments of the present disclosure. As shown, a first image frame (depicted as a dotted rectangle) is actually visible to a user of the display apparatus at time t1 and a second image frame (depicted as a small-dashed rectangle) is actually visible to the user of the display apparatus at time t2, during a lifetime of a given frame being rendered. Notably, the first image frame represents a starting image frame in the lifetime of the given frame and the second frame represents an ending image frame for the lifetime of the given frame.

In FIG. 4, the starting image frame and the ending image frame of a given frame are rendered in a manner that the given frame has render buffer, thereby making content of the given frame available for a longer time during the lifetime of the given frame.

In FIG. 5, the starting image frame and the ending image frame of the given frame are rendered in a manner that edges of the given frame are well fitted to a render area of the display apparatus.

Figure 6A:
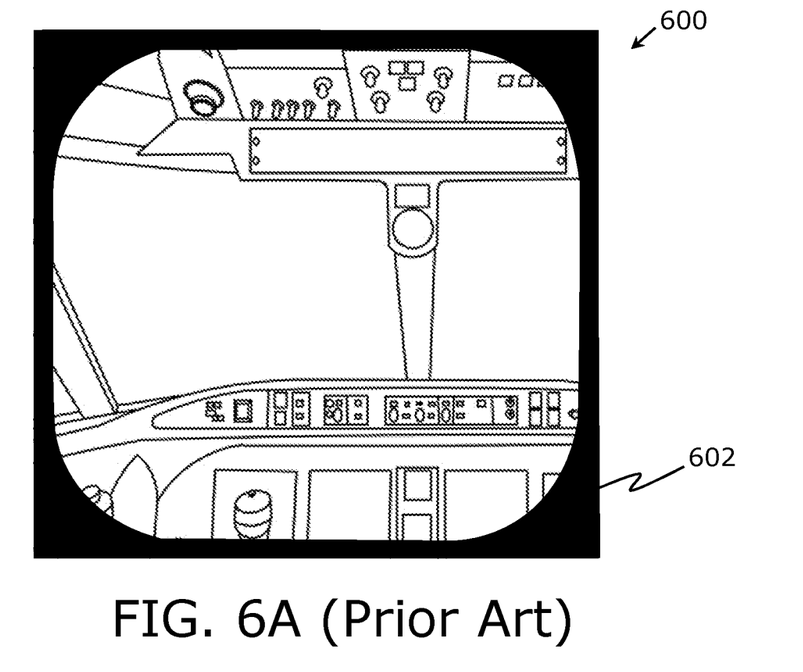

FIG. 6A illustrates how an exemplary view of a visual scene 600 is occluded in prior art. As shown, an occluded area 602 of an image frame of the visual scene 600 is depicted as a darkened (namely, blackened) area between a rectangle with rounded corners and edges of the image frame. Such a manner of occlusion is a typical lens occlusion that is seen in existing display apparatuses.

Figure 6B:
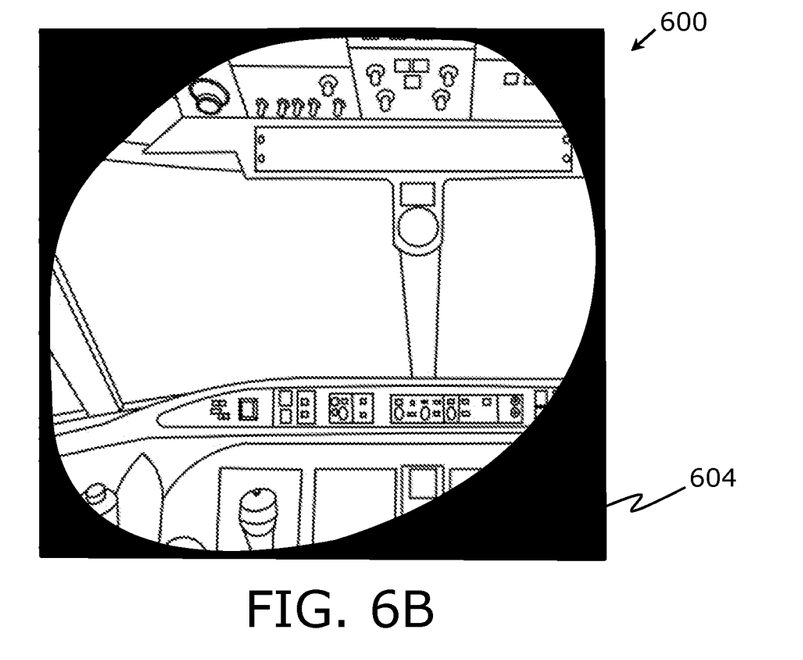
FIG. 6B illustrates how the exemplary view of the visual scene is occluded in a display apparatus of the present disclosure.

FIG. 6B illustrates how the exemplary view of the visual scene 600 is occluded in a display apparatus of the present disclosure. As shown, an occluded area 604 of the image frame of the visual scene 600 is depicted as a darkened area between a tilted deformed-oval shaped region and the edges of the image frame. The occluded area 604 is an optimized occlusion solution since the occluded area 604 is shaped according to a direction indicative of an expected change in view based on head-tracking data indicative of a position and orientation of a user's head.

Figure 7:
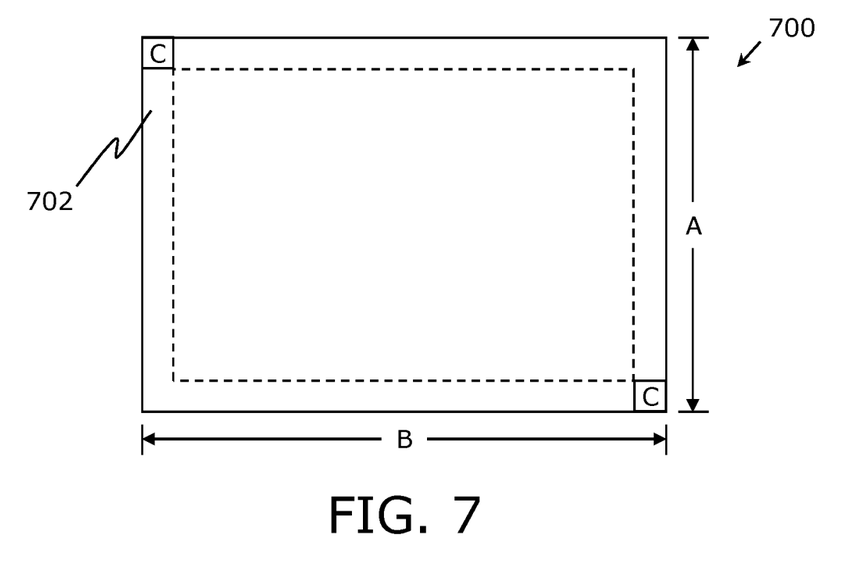
FIG. 7 illustrates how size of an occlusion area is calculated for a given image frame, in accordance with an embodiment of the present disclosure.

Referring to FIG. 7, illustrates how size of an occlusion area 702 is calculated for a given image frame 700, in accordance with an embodiment of the present disclosure. The occluded area 702 is an area enclosed between dashed rectangle and a solid rectangle. When A represents an area of a side of the occlusion area 702 along a length of the given image frame 700, B represents an area of a side of the occlusion area 702 along a width of the given image frame 700, and C represents an area covered by a corner of the occlusion area 702, the occluded area 702 can be calculated using the following mathematical formula:

$$\text{Size of occluded area} = (2 \times A) + (2 \times B) - (4 \times C).$$

Figure 8A:
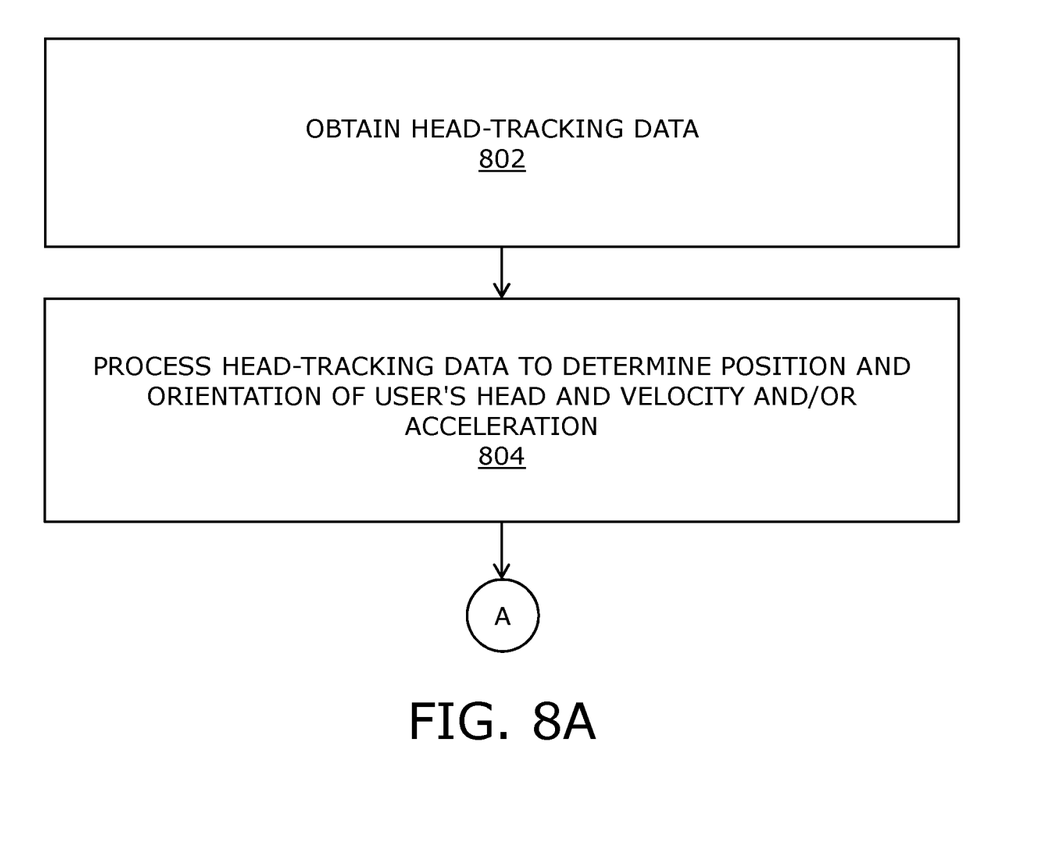
FIGS. 8A and 8B illustrate steps of a method, in accordance with an embodiment of the present disclosure.
Figure 8B:
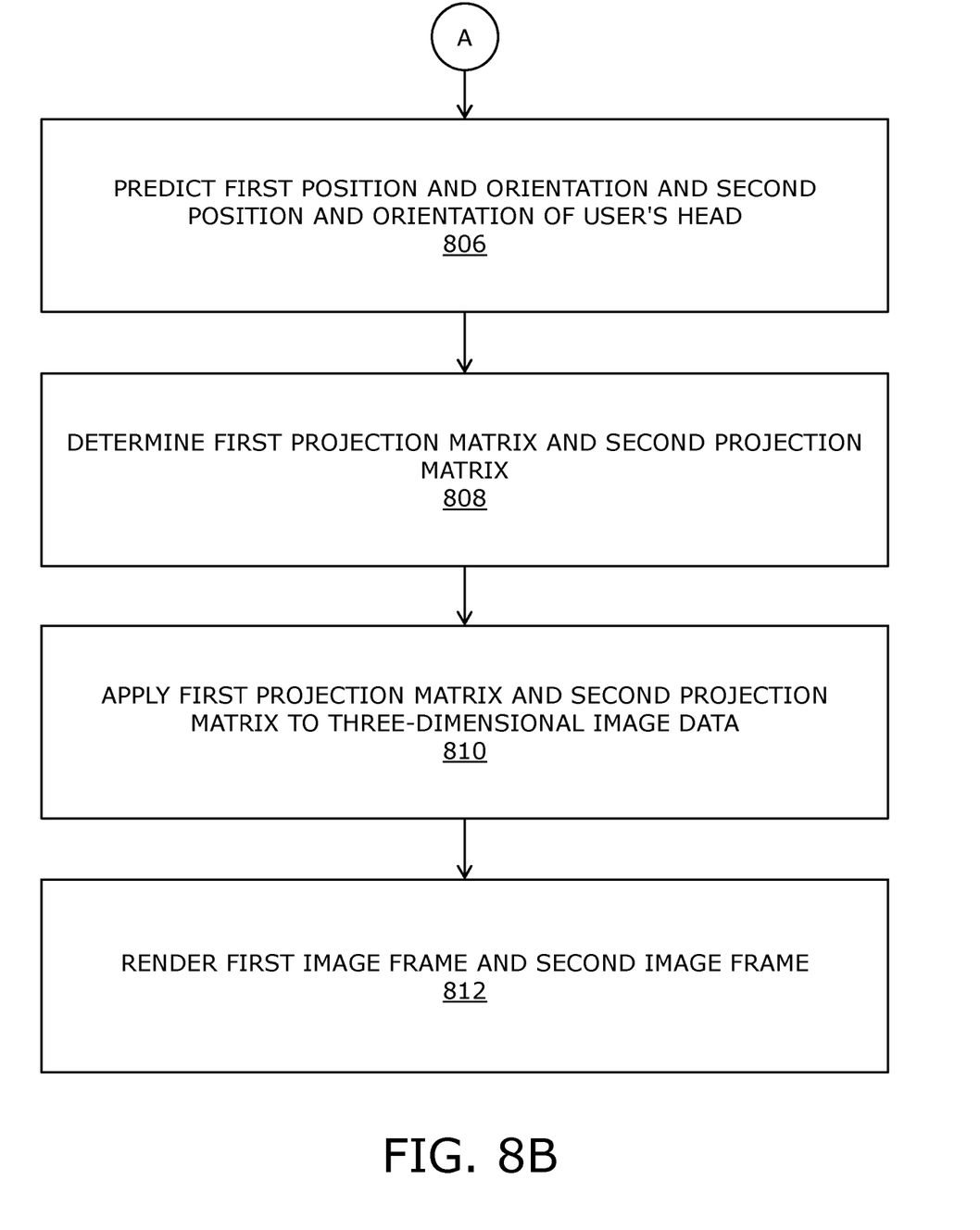

Referring to FIGS. 8A and 8B, illustrated are steps of a method, in accordance with an embodiment of the present disclosure. At a step 802, head-tracking data indicative of a position and orientation of a user's head is obtained. At a step 804, the head-tracking data is processed to determine a current position and orientation of the user's head and a velocity and/or acceleration with which the position and orientation of the user's head is changing. At a step 806, at least a first position and orientation and a second position and orientation of the user's head at time t1 and t2, respectively, during a lifetime of a given frame being rendered, is predicted based on the current position and orientation of the user's head and the determined velocity and/or acceleration. At a step 808, at least one first projection matrix and at least one second projection matrix to be applied to three-dimensional image data pertaining to the given frame, respectively, is determined based on the predicted first position and orientation and the predicted second position and orientation of the user's head. At a step 810, the at least one first projection matrix and the at least one second projection matrix is applied to said three-dimensional image data to generate at least one first image frame and at least one second image frame, respectively. At a step 812, the at least one first image frame and the at least one second image frame are rendered at the time t1 and t2, respectively, during the lifetime of the given frame, via at least one display or projector.

The steps 802 to 812 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:

at least one display or projector;

means for tracking a position and orientation of a user's head; and a processor coupled to the at least one display or projector and said means, wherein the processor or at least one external processor communicably coupled to the processor is configured to:

obtain, from said means, head-tracking data indicative of the position and orientation of the user's head;

process the head-tracking data to determine a current position and orientation of the user's head and a velocity and/or acceleration with which the position and orientation of the user's head is changing;

predict, based on the current position and orientation of the user's head and the determined velocity and/or acceleration, at least a first position and orientation and a second position and orientation of the user's head at time t1 and t2, respectively, during a lifetime of a given frame being rendered;

determine, based on the predicted first position and orientation and the predicted second position and orientation of the user's head, at least one first projection matrix and at least one second projection matrix to be applied to three-dimensional image data pertaining to the given frame, respectively, wherein the first and second projection matrices are indicative of a geometrical relationship between three-dimensional points of an extended-reality visual scene and two-dimensional pixels of the at least one display or projector; and apply the at least one first projection matrix and the at least one second projection matrix to said three-dimensional image data to generate at least one first image frame and at least one second image frame, respectively, wherein the processor is configured to render, via the at least one display or projector, the at least one first image frame and the at least one second image frame at the time t1 and t2, respectively, during the lifetime of the given frame.

2. The display apparatus of claim 1, wherein the processor or the at least one external processor is configured to determine, based on the predicted first position and orientation and the predicted second position and orientation of the user's head, a first occluded area of the at least one first image frame and a second occluded area of the at least one second image frame, respectively, wherein the processor is configured to control the at least one display or projector to render only an area of the at least one first image frame other than the first occluded area at the time t1 and to render only an area of the at least one second image frame other than the second occluded area at the time t2.

3. The display apparatus of claim 1, wherein the processor or the at least one external processor is configured to generate the at least one first image frame and the at least one second image frame as individual parts of at least one combined output frame.

4. The display apparatus of claim 3, wherein the processor or the at least one external processor is configured to determine a combined occluded area that is occluded in both the at least one first image frame and the at least one second image frame, wherein the processor is configured to control the at least one display or projector to render only an area of the at least one combined output frame other than the combined occluded area.

5. The display apparatus of claim 1, further comprising means for tracking gaze directions of the user's eyes, wherein the processor or the at least one external processor is configured to:
  obtain, from said means, eye-tracking data indicative of the gaze directions of the user's eyes;
  process the eye-tracking data to determine current gaze directions of the user's eyes and velocities and/or accelerations with which the gaze directions of the user's eyes are changing;
  predict, based on the current gaze directions of the user's eyes and the determined velocities and/or accelerations, first gaze directions and second gaze directions of the user's eyes at the time t1 and t2, respectively, during the lifetime of the given frame being rendered; and
  determine, based on the predicted first gaze directions and the predicted second gaze directions of the user's eyes, the at least one first projection matrix and the at least one second projection matrix to be applied to the three-dimensional image data pertaining to the given frame, respectively.

6. The display apparatus of claim 5, wherein the at least one display or projector comprises at least one context display or projector and at least one focus display or projector, wherein the at least one first image frame comprises a first context image frame and a first focus image frame to be rendered at the at least one context display or projector and the at least one focus display or projector, respectively, at the time t1, and the at least one second image frame comprises a second context image frame and a second focus image frame to be rendered at the at least one context display or projector and the at least one focus display or projector, respectively, at the time t2.

7. The display apparatus of claim 6, wherein an angular resolution of the first context image frame is lower than an angular resolution of the first focus image frame, and an angular resolution of the second context image frame is lower than an angular resolution of the second focus image frame, wherein the processor or the at least one external processor is configured to:
  determine, based on the predicted first gaze directions of the user's eyes, an opacity value of at least a portion of the first focus image frame and an opacity value of at least a portion of the first context image frame, wherein a projection of said portion of the first focus image frame is to be optically combined with a projection of said portion of the first context image frame; and
  determine, based on the predicted second gaze directions of the user's eyes, an opacity value of at least a portion of the second focus image frame and an opacity value of at least a portion of the second context image frame, wherein a projection of said portion of the second focus image frame is to be optically combined with a projection of said portion of the second context image frame.

8. A method comprising:
  obtaining head-tracking data indicative of a position and orientation of a user's head;
  processing the head-tracking data to determine a current position and orientation of the user's head and a velocity and/or acceleration with which the position and orientation of the user's head is changing;
  predicting, based on the current position and orientation of the user's head and the determined velocity and/or acceleration, at least a first position and orientation and a second position and orientation of the user's head at time t1 and t2, respectively, during a lifetime of a given frame being rendered;
  determining, based on the predicted first position and orientation and the predicted second position and orientation of the user's head, at least one first projection matrix and at least one second projection matrix to be applied to three-dimensional image data pertaining to the given frame, respectively, wherein the first and second projection matrices are indicative of a geometrical relationship between three-dimensional points of an extended-reality visual scene and two-dimensional pixels of the at least one display or projector;
  applying the at least one first projection matrix and the at least one second projection matrix to said three-dimensional image data to generate at least one first image frame and at least one second image frame, respectively; and
  rendering, via at least one display or projector, the at least one first image frame and the at least one second image frame at the time t1 and t2, respectively, during the lifetime of the given frame.

9. The method of claim 8, further comprising:
  determining, based on the predicted first position and orientation and the predicted second position and orientation of the user's head, a first occluded area of the at least one first image frame and a second occluded area of the at least one second image frame, respectively; and
  controlling the at least one display or projector to render only an area of the at least one first image frame other than the first occluded area at the time t1 and to render only an area of the at least one second image frame other than the second occluded area at the time t2.

10. The method of claim 8, further comprising generating the at least one first image frame and the at least one second image frame as individual parts of at least one combined output frame.

11. The method of claim 10, further comprising:
  determining a combined occluded area that is occluded in both the at least one first image frame and the at least one second image frame; and
  controlling the at least one display or projector to render only an area of the at least one combined output frame other than the combined occluded area.

12. The method of claim 8, further comprising:
  obtaining eye-tracking data indicative of gaze directions of the user's eyes;
  processing the eye-tracking data to determine current gaze directions of the user's eyes and velocities and/or accelerations with which the gaze directions of the user's eyes are changing;
  predicting, based on the current gaze directions of the user's eyes and the determined velocities and/or accelerations, first gaze directions and second gaze directions of the user's eyes at the time t1 and t2, respectively, during the lifetime of the given frame being rendered; and determining, based on the predicted first gaze directions and the predicted second gaze directions of the user's eyes, the at least one first projection matrix and the at least one second projection matrix to be applied to the three-dimensional image data pertaining to the given frame, respectively.

13. The method of claim 12, wherein the at least one display or projector comprises at least one context display or projector and at least one focus display or projector, wherein the at least one first image frame comprises a first context image frame and a first focus image frame for rendering at the at least one context display or projector and the at least one focus display or projector, respectively, at the time t1, and the at least one second image frame comprises a second context image frame and a second focus image frame for rendering at the at least one context display or projector and the at least one focus display or projector, respectively, at the time t2.

14. The method of claim 13, wherein an angular resolution of the first context image frame is lower than an angular resolution of the first focus image frame, and an angular resolution of the second context image frame is lower than an angular resolution of the second focus image frame, wherein the method further comprises:

determining, based on the predicted first gaze directions of the user's eyes, an opacity value of at least a portion of the first focus image frame and an opacity value of at least a portion of the first context image frame, wherein a projection of said portion of the first focus image frame is optically combined with a projection of said portion of the first context image frame; and determining, based on the predicted second gaze directions of the user's eyes, an opacity value of at least a portion of the second focus image frame and an opacity value of at least a portion of the second context image frame, wherein a projection of said portion of the second focus image frame is optically combined with a projection of said portion of the second context image frame.

\* \* \* \* \*